Oct. 14, 1924.
H. PARKIN
PISTON RING
Filed April 18, 1922
1,511,576
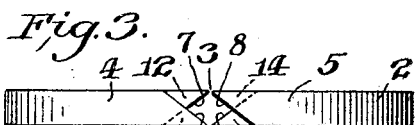
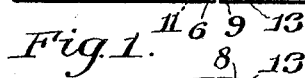
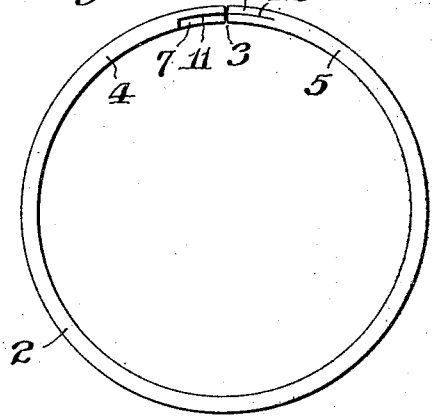
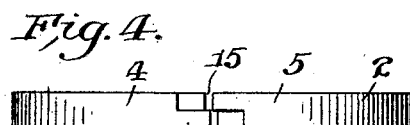
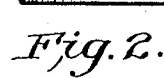
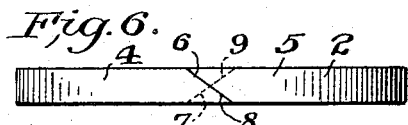
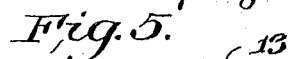
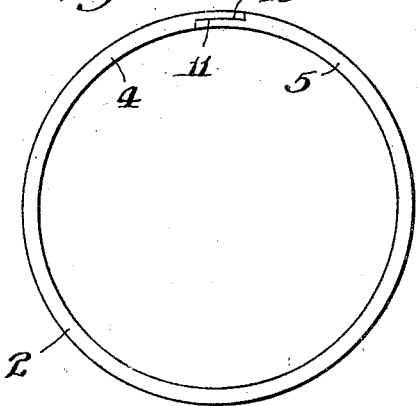
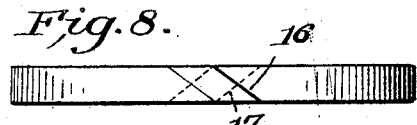
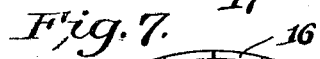
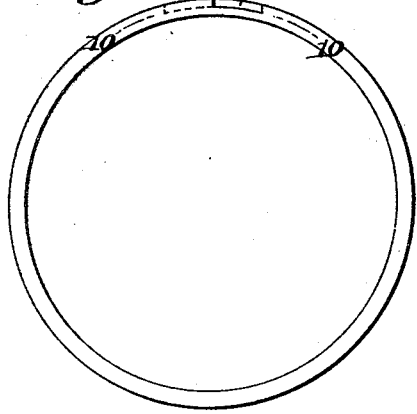
Inventor:
Henry Parkin
by A. V. Trout
Attorney Patented Oct. 14, 1924.

1,511,576

UNITED STATES PATENT OFFICE.

HENRY PARKIN, OF PHILADELPHIA, PENNSYLVANIA.

PISTON RING.

Application filed April 18, 1922. Serial No. 555,077.

*To all whom it may concern:*

Be it known that I, HENRY PARKIN, a citizen of the United States, residing at Philadelphia, in the county of Philadelphia and State of Pennsylvania, have invented certain new and useful Improvements in Piston Rings, of which the following is a specification.

The object of my invention is to provide a single piece piston ring of novel and efficient construction which may be manufactured in a very economical manner and which will be provided with a leak proof joint which will prevent transverse displacement in all directions of the end portions forming the joint.

With the above and related objects in view, the invention resides in the novel construction, combination and arrangement of parts of the ring, as will be hereinafter described and claimed.

In the accompanying drawings, illustrating my invention,

Figure 1 is a side view of a piston ring embodying my invention.

Figure 2 is a similar view showing a modified form of embodiment of the invention.

Figures 3 and 4 are top views of the rings shown in Figs. 1 and 2, respectively.

Figures 5 and 6 are side and top views, respectively, of the ring shown in Fig. 1, showing the same in the closed position.

Figures 7 and 8 are side and top views, respectively, of the ring shown in Figs. 1 and 3, showing the condition thereof at one stage of the process of manufacturing the same.

Referring to Figs. 1, 3, 5 and 6, 2 designates the ring which is formed of a single piece of metal. The ring is split, at 3, by two diagonal grooves extending through the inner and outer walls thereof and meeting each other, providing two adjacent end portions 4 and 5, each of which are provided with two separate end faces 6, 7, and 8, 9, respectively. The two end faces of each member are arranged in separate planes which cross each other preferably midway between the sides of the ring, and which preferably extend from side to side of the ring, as shown in the drawings.

While the two end faces of each end portion are arranged in planes which cross each other, the respective end faces 6 and 8 of the two end portions 4 and 5 are parallel and coincide with each other, when the end portions are brought together, and the respective end faces 7 and 9 of the two end portions 4 and 5 are parallel and coincide with each other when the end portions are brought together, as shown in Figs. 5 and 6.

In addition to being arranged in separate planes which cross each other, the two end faces of each end portion are arranged on the respective sides of a plane, indicated by dot-and-dash line 10 in Fig. 7. The ring 2, being curved, the line 10 may be said to indicate an imaginary curved surface following the curved lines of the ring. Thus the end faces 6 and 8 are located on one side of the imaginary surface indicated by the line 10, and the end faces 7 and 9 are located on the other side of said surface.

The end portions 4 and 5 of the ring 2 each have two oppositely directed faces 11, 12, and 13, 14, respectively, which coincide with the imaginary surface which divides the end faces 6 and 8 from the end faces 7 and 9 and which follows the line 10, as shown in the drawings.

From the construction hereinbefore described and illustrated in the drawings, it will be seen that in the normal condition of the ring 2 the two diagonal grooves split the ring at 3 and that when the meeting end portions 4 and 5 are brought together, the faces 6, 7, 11 and 12 of the end portion 4 will join and register with the faces, 8, 9, 13 and 14, respectively, of the end portion 5, and thus provide a joint which will prevent relative transverse displacement of the end portions 4 and 5 in all directions, by the engagement of the said faces of one end portion with the said faces of the other end portion when the end portions 4 and 5 are held together by a cylinder containing a piston carrying the ring 2. Thus my improved joint will provide a leak proof joint and will prevent pressure fluid from passing the ring.

In the modification shown in Figs. 2 and 4, the ring is split at 15 by cutting the two diagonal grooves in the opposite side walls thereof instead of in the inner and outer walls thereof, as shown in Figs. 1 and 3.

My improved joint structure enables me to manufacture piston rings containing the same in a very simple and economical manner which may be briefly described as follows: The ring is first cast in solid, annular form of uniform cross section throughout. Then, in manufacturing the ring shown in Figs. 1 and 3, by a single operation in a milling machine, a diagonal groove 16, illustrated by full lines in Figs. 7 and 8, is milled in the outer wall of a ring, of a depth equal to one-half of the thickness of the ring, thus forming the faces, 6, 8, 12 and 13, previously described. Then, by but one more operation in a milling machine, a diagonal groove 17, crossing the groove 16 and illustrated by the dot-and-dash lines in Fig. 9, is milled in the inner wall of the ring deep enough to meet the groove 16, thereby splitting the ring and forming the faces 7, 9, 11 and 14, previously described. The ring 2 is then contracted, as shown in Figs. 5 and 6 and its outer surface is finished to fit within a cylinder.

The ring shown in Figs. 2 and 4 may be similarly manufactured by milling two diagonal grooves in the opposite side walls thereof.

I claim as my invention:

1. A packing ring formed in a single piece and having a joint therein formed solely by the walls of two diagonal grooves cut in opposite walls thereof and meeting each other in the body of the ring and crossing each other and being of sufficient width to split the ring in the normal condition thereof.

2. A packing ring formed in a single piece and having a joint therein formed solely by the walls of two diagonal grooves cut in opposite walls thereof and meeting each other in the body of the ring and crossing each other and providing two adjacent end portions each of which forms two pointed projections which do not lap each other in the normal condition of the ring.

In testimony whereof I affix my signature hereto.

HENRY PARKIN.